United States Patent [19]
McGaa

[11] Patent Number: 5,868,255
[45] Date of Patent: Feb. 9, 1999

[54] ALTERNATING CURRENT MAGNETIC SEPARATOR

[76] Inventor: John R. McGaa, 1078 S. Century Ave., St. Paul, Minn. 55071

[21] Appl. No.: 707,124

[22] Filed: Sep. 3, 1996

[51] Int. Cl.$^6$ ....................................................... B03C 1/30
[52] U.S. Cl. ............................ 209/39; 209/214; 209/215; 209/223.1; 209/232
[58] Field of Search ................................ 209/39, 3, 214, 209/215, 223.1, 225, 232, 158, 159, 208; 241/24.14, 24.25, 79, 79.1

[56] References Cited

U.S. PATENT DOCUMENTS

| 827,499 | 7/1906 | Bring | 209/39 X |
|---|---|---|---|
| 2,612,262 | 9/1952 | Symington et al. | 209/39 X |
| 4,316,542 | 2/1982 | Zelenov et al. | 209/39 |

OTHER PUBLICATIONS

L.F. Rychkov, et al. *Effect of Ultrasonic Treatment of Magnetite Slurry on the Indicators of Magnetic Enrichment*, Plenum Publishing Corporation, 1983, pp. 352–354.

O. Goodluck et al, *Magnetic Separation in Alternating Fields*, IEEE Transactions on Magnetics, vol. MAG–23, No. 3, May 1987, pp. 1909–1912.

J.A. Oberteuffer, *Magnetic Separation: A Review of Principles, Devices, and Application* IEEE Transactions of Magnetics, vol. MAG–10, No. 2, Jun. 1974, pp. 223–238.

Martinez et al., *Gravity–Magnetic Separation*, E&MJ, Jun. 1991, p. 16.

Kelland, *Submicron Magnetic Particle Separation*, Particulate Science and Technology, 1985, p. 101.

Jones et al., *Mineral Processing and Extractive Metallurgy*, Kunming Conference 1984.

D.A. Norrgran et al., *Advances in the Magnetic Collection of Fine Particles: Magnetic Filtration*, Fluid/Particle Separation Journal, vol. 6, No. 3, Sep. 1993, pp. 132–135.

D.A. Norrgran et al., *Processes and Equipment used in Magnetic Separation*, The Center for Professional Development, Continuing Education and Extension, University of Minnesota, Duluth, Jan. 15, 1991.

J.A. Jirestig et al., *Magnetic Separation in Sulfide Processing*, Minerals and Metallurgical Processing, Nov. 1993, pp. 176–181.

R.A. Williams et al., *Simulation of Magnetic Flocculation Behaviour of Fine Minerals*, International Journal of Mineral Processing, 33 (1991), pp. 175–192.

R.R. Klimpel, *The Engineering Analysis of Dispersion Effects in Selected Mineral Operations*, Fine Particles Processing, vol. 2, 1980, Department of Mineral Engineering, The Pennsylvania State University, Chapter 58, pp. 1129–1152.

Y. Wang et al., *The Recovery of Hematite and Chromite Fines and Ultrafines by Wet Magnetic Methods*, Minerals and Metallurgical Processing, May 1994, pp. 87–96.

D. Zelinski, *Magnetic Separators*, Continental Sales and Equipment, Hibbing, Minnesota, Magnetic Concentration: Theory Practice Jan. 15, 1991.

R.R. Oder, *High Gradient Magnetic Separation Theory and Applications*, IEEE Transactions on Magnetics, vol. MAG–12, No. 5, Sep., pp. 428–435.

(List continued on next page.)

*Primary Examiner*—David H. Bollinger
*Attorney, Agent, or Firm*—Kinney & Lange, P.A.

[57] ABSTRACT

A magnetic ore purification system for enriching magnetic ore concentration in a feed material. The system includes an elutriator, an alternating current magnet, and an ultrasonic separator. The elutriator has a feed port for introducing the feed material into the elutriator and an enriched material port for collecting an enriched material having a magnetic ore concentration that is greater than the feed material. The alternating current magnet generates a uniform low strength magnetic field within the elutriator. The ultrasonic transducer introduces ultrasonic energy into the elutriator.

23 Claims, 2 Drawing Sheets

OTHER PUBLICATIONS

J.H.P. Watson, *Approximate Solutions of the Magnetic Separator Equations*, Journal Application Phys. 14, E.C.L.P. & Co., Limited, John Keay House, St. Austell, Cornwall, England (1973).

Y. Zimmels et al., *Principles in High–Gradient Magnetogravimetric Separation*, IEEE Transactions on Magnetics, vol., MAG–13, No. 4, Jul. 1977, pp. 1045–1052.

L. Petrakis et al., *High Gradient Magnetic Separations in Water Effluents*, IEEE Transactions on Magnetics, vol. MAG–14, No. 5, Sep. 1978, pp. 491–493.

J. Macknis, *Continuous Magnetic Separator*, Lift Feeder, Inc., Yardley PA., Nov. 4, 1993.

G. Gillet et al., *Superconducting Magnetic Separator and its Applications in Mineral Processing*, Minerals and Metallurgical Processing, Nov. 1986, pp. 246–251.

S.T. Hall et al., *Some Applications of Magnetic Separation in Fine Particle Processing*, Department of Mining and Metallurgical Engineering, McGill University, Montreal, Canada, Apr. 1985, vol. 1, pp. 55–65.

G.Y. Robinson, Jr., *Economics of High Gradient Magnetic Separation of Ceramic Minerals*, Ceramic Bulletin, vol. 57, No. 5, 1978, pp. 498–502.

J.A. Oberteuffer et al., *Recent Advances in High Gradient Magnetic Separation*, Chapter 60, Sala Magnetics, Inc. Cambridge, MA, 1980, pp. 1178–1217.

J. Svoboda et al., *Particle Capture in the Matrix of a Magnetic Separator*, International Journal of Mineral Processing, 27 (1989), pp. 75–94.

Brochure, *High Gradient Magnetic Separator*, Ferrous Wheel, Erie, PA., (1993).

Brochure, *Eriez, It's All Here in Black and Orange*, (1995).

Brochure, *Wet Drum Separators*, (1993).

Brochure, *Superconducting High Gradient Magnetic Separator System*, (1995).

ALTERNATING CURRENT MAGNETIC SEPARATOR

BACKGROUND OF THE INVENTION

The present invention relates generally to a system for enriching magnetic ore concentration in a feed material. More particularly, the present invention relates to a ultrasonic magnetic separator for enriching magnetite concentration in iron ore.

As steelmaking processes become technologically more advanced, the raw materials used in the steelmaking processes are required to conform with more stringent standards. For example, "commodity grade" iron ore for use in blast furnaces must have a gangue concentration of less than 5 percent by weight. Iron ore used in the production of direct reduced iron pellets must have a gangue concentration of less than 2 percent by weight.

To attain either of the preceding gangue concentrations, it is typically necessary to beneficiate iron ore to reduce the gangue concentration in the iron ore. The required degree of processing and the expense associated with the benefication process depends on the initial gangue level as well as the hardness of the iron ore. For example, the major domestic iron ore, taconite ore, requires a significant degree of processing because the gangue is intimately associated with the magnetite.

An initial step in the iron ore benefication process involves grinding the iron ore. Components in ground iron ore may be classified into three categories: free magnetite, middlings, and free silica. Middlings and free silica are collectively referred to as gangue.

Middlings contain magnetite and silica that are intimately mixed together. Because middlings contain a mixture of magnetite and silica, more finely grinding middlings releases more free magnetite and free silica, which allows a higher percentage of silica to be separated from magnetite.

Conventional iron ore benefication processes typically involve grinding the iron ore to between 80 and 90 percent by weight less than 45 microns, which liberates magnetite from gangue. Gangue may then be separated from magnetite using magnetic separation techniques.

While more finely grinding iron ore theoretically allows the iron ore to be enriched to a greater degree because a higher percentage of middlings are broken down into magnetite and gangue, the efficiency of conventional benefication processes decreases as the iron ore particle size decreases because competing hydrodynamic and interparticle forces within the magnetic separator cause silica to be entrained with the magnetite and carried into the iron ore concentrate. For example, standard intensity drum-type magnetic separators perform optimally when the iron ore is ground to a particle size of between 10 and 1,000 microns.

Enriched iron ore obtained from prior art benefication processes relying solely on grinding and magnetic separating have gangue concentrations of between about 5 and 6 percent by weight, which makes the iron ore unacceptable for use in many steelmaking processes. To further reduce the gangue concentration, silica floatation processes are typically utilized.

Silica floatation processes require chemical reagents to be mixed with the iron ore. While silica floatation processes enable the gangue concentration to be reduced to approximately 4 percent by weight, the use of chemical reagents significantly increases the cost of the benefication process. The chemical reagents also necessitate that effluent generated from the floatation process be purified before the effluent is disposed of or reused.

Floatation techniques also experience a decrease in efficiency when processing ultrafine particles. For particles smaller than 10 microns, floatation recovery falls steadily. Below 1 micron, separation efficiency using floatation techniques becomes unacceptable.

Subjecting an iron ore slurry to a preliminary ultrasound treatment and then separating the iron ore slurry with a magnetic separator is described by Rychov et al. in Effect of Ultrasonic Treatment of Magnetite Slurry on the Indicators of Magnetic Enrichment. Rychov et al. indicates that this preliminary treatment allows the iron ore level in the iron ore concentrate to be increased by 1.13 percent. The maximum iron concentration produced during Rychov et al.'s studies was 64.84 percent.

In an article entitled Magnetic Separation in Alternating Fields, Goodluck et al. discusses using an alternating current high gradient magnetic separator. Goodluck et el. indicates that the alternating current magnet was operated at 550 volts and 60 hertz so that a field of 600 gauss was generated by the magnet.

Goodluck et al. describes enriching an iron ore slurry by passing the iron ore slurry through a cylindrical canister having an inner diameter of 3.8 centimeters. The cylindrical canister was packed with a stack of wire mesh pieces that were arranged to form a matrix. In one configuration, Goodluck et al. describes that the matrix had a length of 3 centimeters and that the wire mesh had a diamond shaped hole of 4 millimeters by 2 millimeters. Goodluck et al. further indicates that mechanically vibrating the separator increases the enrichment of the iron ore.

SUMMARY OF THE INVENTION

The present invention includes a magnetic ore purification system for enriching magnetic ore concentration in a feed material. The system includes an elutriator, an alternating current magnet, and an ultrasonic transducer. The elutriator has a feed port for introducing the feed material and an enriched port for collecting an enriched material having a magnetic ore concentration that is greater than the feed material.

As the feed material passes between the feed port and the concentrate port, the feed material is subjected to a uniform low strength magnetic field generated by the alternating current magnet. The feed material is also subjected to ultrasonic energy emitted by an ultrasonic transducer.

DETAILED DESCRIPTION OF THE PREFERRED EMBODIMENTS

Figure 1:
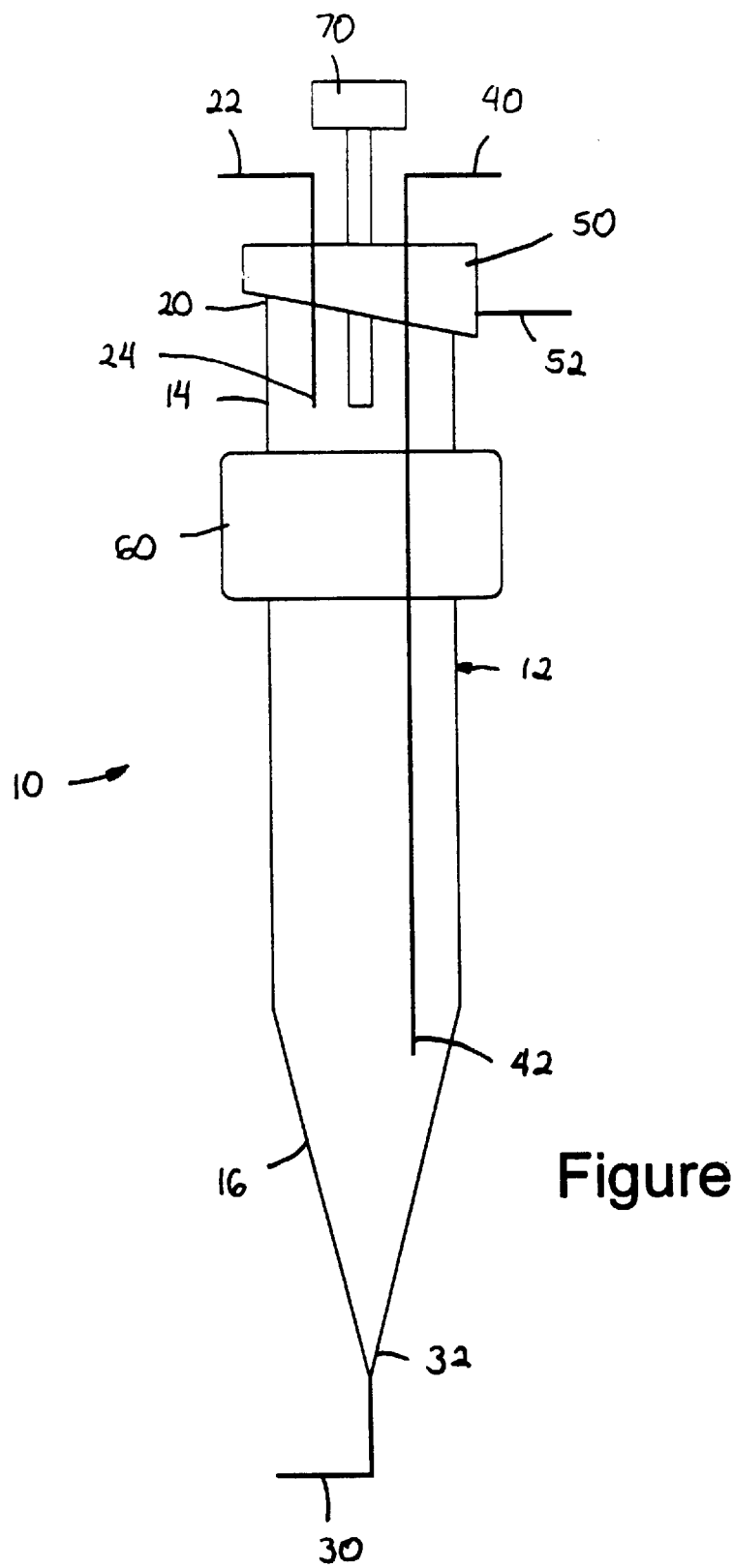
FIG. 1 is an illustration of the a separator according to the present invention.

The present invention is a magnetic ore separator, as most clearly illustrated at 10 on FIG. 1. Using the separator in conjunction with the method of the present invention allows a high purity iron ore concentrate to be produced without the use of silica floatation or the addition of chemical reagents.

As used herein, the term "high purity iron ore concentrate" means that the iron ore concentrate has a gangue concentration of less than 5 percent by weight. Preferably, the iron ore concentrate has a gangue concentration of less than approximately 2 percent by weight. All references to concentration in this application are percent by weight unless identified otherwise.

The separator 10 and process of the present invention further enable a high concentration of the magnetite in the iron ore material to be recovered in the iron ore concentrate. As used herein, the term "high concentration" means that recovery of magnetite in the iron ore concentrate is greater than 90 percent. More preferably, the recovery of magnetite in the iron ore concentrate is greater than 96 percent.

Using the present invention, it is possible to produce iron ore concentrates with the preceding gangue concentrations and magnetite recovery levels because the present invention does not experience the decrease in efficiency as the particle size of the iron ore is decreased. Rather, the efficiency of the present invention increases as the particle size decreases because the more finely ground particles separate a higher percentage of middlings into magnetite and gangue.

While prior art iron ore enrichment processes rely on chemical dispersants and high flow rates to enhance the separation of gangue from magnetite, the present invention separates magnetite from gangue using ultrasonic energy, alternating current magnetic fields, or a combination of ultrasonic energy and alternating current magnetic fields.

The ultrasonic magnetic separator 10 includes an elutriator 12 that is preferably oriented in a substantially vertical orientation. The elutriator 12 preferably has a substantially cylindrical main body portion 14 and a substantially conical lower portion 16 that extends from the main body portion 14. While the elutriator 12 is illustrated as having a cylindrical main body portion 14 and conical lower portion 16, a person of ordinary skill in the art will appreciate that other configurations may be used without departing from the scope of the present invention.

The dimensions of the main body portion 14 and the conical lower portion 16 are selected based upon the desired operating capacity of the elutriator 12. When the elutriator 12 is designed to produce iron ore concentrate at a rate of approximately 100 pounds per hour, the main body portion 14 has a diameter of approximately 4 inches and a length of approximately 48 inches. The conical lower portion 16 used with the preceding iron ore material feed rate has a length of approximately 18 includes.

The elutriator 12 is fabricated out of a non-magnetizable material so that the elutriator 12 does not interfere with the magnetic field inside of the elutriator 12. Examples of suitable materials for fabricating the elutriator 12 include plastic, fiberglass, glass and stainless steel.

Proximate to an upper end 20 of the elutriator 12, a feed line 22 is provided for introducing an iron ore material into the elutriator 12. A lower end 24 of the iron ore material feed line 22 preferably extends into the main body portion 14.

The elutriator 12 also preferably includes a water feed line 30, which is preferably oriented proximate to a lower end 32 of the elutriator 12. Positioning the water feed line 30 at an opposite end of the elutriator 12 from the iron ore material feed line 22 allows the elutriator 12 to be operated in a countercurrent manner.

The elutriator 12 also includes a collection line 40 for collecting iron ore concentrate. A lower end 42 of the iron ore concentrate collection line 40 preferably extends downwardly from the upper end 20 into the conical lower portion 16. The iron ore concentrate line 40 is preferably adjustable so that a height of the lower end 42 may be varied to optimize the purity of the iron ore concentrate as well as the recovery of magnetite in the iron ore concentrate.

The iron ore concentrate line 40 preferably extends into the elutriator 12 from the upper end 20 of the elutriator 12 to minimize the number of holes that must be formed in the elutriator 12. Minimizing the number of holes in the elutriator 12 enhances the reliability of the separator 10 of the present invention.

Proximate to the upper end 20, the elutriator 12 includes a collection trough 50 for collecting a waste mixture that is generated by the separation process. The waste mixture is preferably directed from the trough 50 to a water reclamation process or disposal facility using a collection line 52.

The separator 10 also includes a magnet 60 that extends around the elutriator 12. The magnet 60 used with the present invention is preferably an alternating current (AC) coil magnet that provides a uniform low strength magnetic field over a large volume. The diffuse magnetic field produces less dampening effects and allows better ultrasound penetration within the elutriator. Using an alternating current magnet decreases inter-particle frictional forces that hinder counter-current flow of magnetic and non-magnetic particles.

When the separator 10 utilizes a combination of magnetic fields and ultrasonic energy, it is possible to use a permanent magnet. However, superior results are typically obtained by alternating current magnets because permanent magnets typically produce localized, relatively high-strength fields.

The intensity of the magnetic field is preferably adjustable by varying the voltage in the magnetic coil. When used in conjunction with an iron ore concentrate production rate of approximately 100 pounds per hour, the alternating current magnet 60 is preferably selected with the following characteristics: 120 volts, 4–6 amps, and 100–200 gauss. The alternating current magnet 60 is preferably operated at a frequency of 60 hertz, which corresponds with the frequency of conventional electrical distribution systems.

The separator 10 of the present invention also preferably includes an ultrasonic transducer 70 that is capable of introducing ultrasonic energy into the elutriator 12. The number and size of the ultrasonic transducers 70 that are used in conjunction with the present invention are selected based on the size of the elutriator 12 and the flow rates that which the separator 10 will be operated. While FIG. 1 illustrates that the ultrasonic transducer 70 extends into the elutriator, the ultrasonic transducer may also be positioned around an outside surface of the elutriator 12.

The ultrasonic energy imparted into the elutriator 12 is preferably variable such that the intensity of the ultrasonic energy waves may be varied. The intensity of the ultrasonic energy is selected so as to induce sufficient turbulence into the solution within the elutriator 12. However, the intensity of the ultrasonic energy is preferably optimized to obtain the desired degree of turbulence while minimizing the cost of operating the separator 10.

Ultrasonic energy increases dispersion and turbulence in the magnetic zone of the elutriator 12. It has been found that the effect of ultrasonic energy is most pronounced in micron and submicron size particles where electrostatic agglomeration and magnetic flocculation prevent conventional separation techniques from being effective.

The combination of ultrasonic induced cavitation with magnetism, gravity, and fluid viscosity allows decoupling of fluid flow rates from the conventional grade-recovery relationship. With ultrasonic energy, high-grade materials are realized at low fluid flow rates, which enhance the ability to recover a higher proportion of the magnetite in the iron ore concentrate. The present invention thereby provides a high recovery rate while not requiring the use of chemical dispersants or high flow rates.

In operation, the iron ore material is preferably ground to 80 percent less than 325 mesh prior to processing with the method of the present invention. Iron ore material having this granulation is conventionally referred to as finisher feed. Iron ore material and water are introduced into the elutriator 12 through the iron ore material feed line 22 and the water feed line 30, respectively, so that the iron ore material and water flow through the elutriator 12 in countercurrent directions.

The iron ore material and water feed rates are preferably selected so that the water-iron ore material ratio was approximately 8:1. When used in conjunction with a 100 pounds per hour unit, the iron ore material feed rate is preferably about 1 kilogram per minute and the water feed rate is preferably about 8 liters per minute. As described above, the elutriator 12 used with the 100 pounds per hour unit preferably has a length of approximately 66 inches and a diameter of approximately 4 inches.

Two alternating current magnets and one ultrasound transducer are preferably used in conjunction with the 100 pounds per hour unit. Each of the coils preferably weighs approximately 25 pounds and is formed from approximately 1360 feet of wire. Each of the magnets was operated at approximately 120 volts and at between about 4 and 6 amps so that a magnetic field of between 100 and 200 gauss was produced.

As the iron ore material passes through the elutriator 12, iron ore material is simultaneously subjected to the forces of magnetism, gravity, fluid viscosity, and ultrasonic dispersion. The magnetic field produces mutual forces of attraction between magnetite particles, which causes the magnetite to coalesce into "particulate strings". The string phenomenon is a significant part of the separation process as it arranges the magnetic particles in a geometry that minimizes the effect of the upward water flow.

Gravitational forces cause the particulate strings to move downwardly against the fluid forces exerted by the upwardly flowing water until the particulate strings drop out of the magnetic zone. The particulate strings continue moving downwardly until the particulate strings are collected through the lower end 42 of the iron ore concentrate line 40.

The lower end 42 of the iron ore concentrate line 40 is adjusted to optimize the purity of the iron ore concentrate as well as the recovery of magnetite in the iron ore concentrate. As noted above, the iron ore concentrate preferably has a gangue concentration of less than about 4 percent and the magnetite recovery is preferably greater than 90 percent. The iron ore concentrate is generally referred to as an enriched material.

The upward flow of the water causes the gangue to be separated from the magnetite and moved upwardly. This mixture of gangue is generally referred to as a waste mixture. The waste mixture is moved upwardly until it passes out of the elutriator 12 and into the trough 50. At this point, the waste material is directed to a water reclamation facility or is disposed used appropriate mechanisms.

Figure 2:
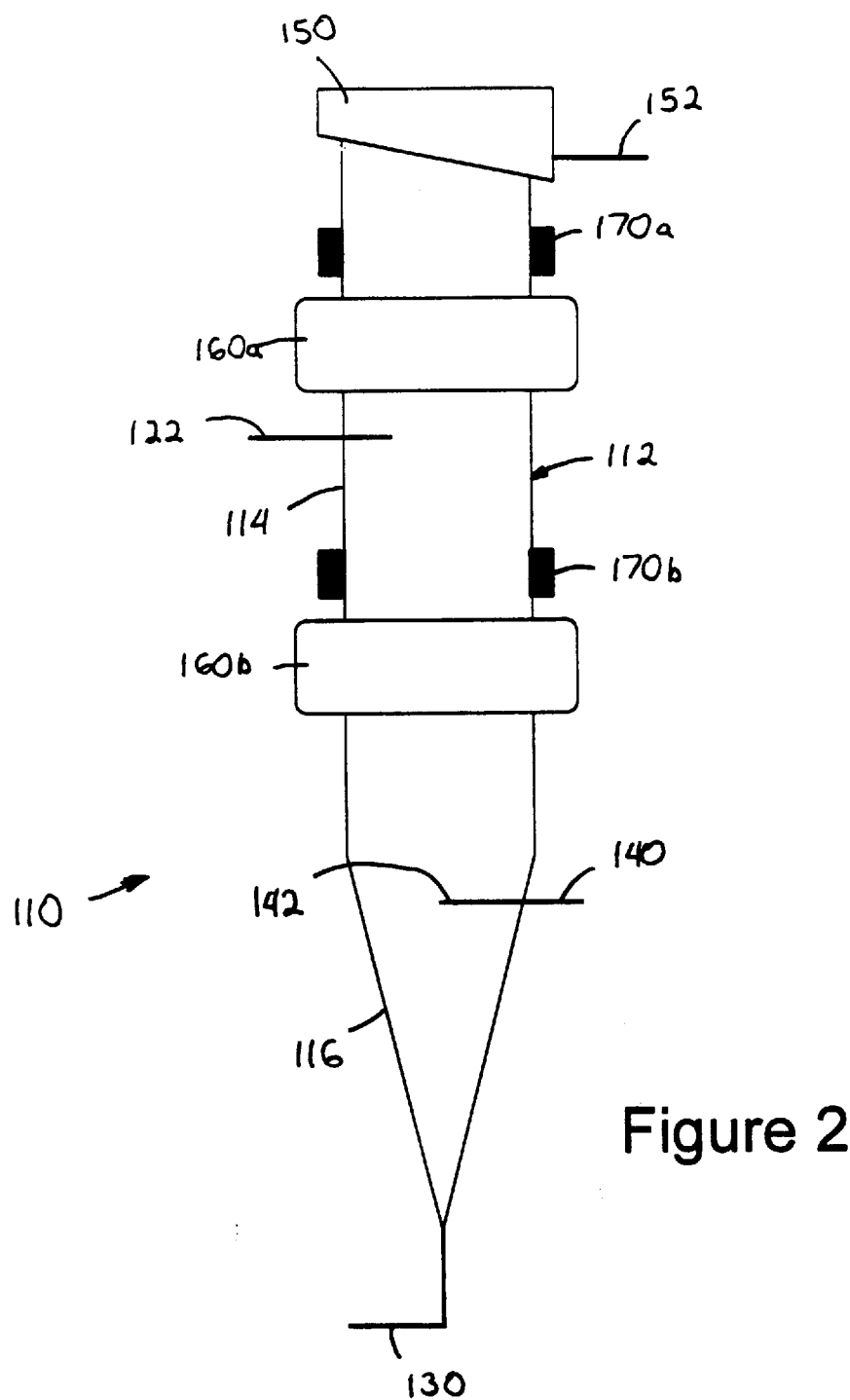
FIG. 2 is an illustration of an alternative embodiment of the separator.

In an alternative embodiment that is designed to for higher iron ore concentrate production rates, such as one ton per hour, the separator 110 includes an elutriator 112 with a substantially cylindrical main body portion 114 and a substantially conical layer portion 116 that extends from a lower end of the main body portion 114, as most clearly illustrated in FIG. 2.

To provide greater control over the separation process, the separator 110 includes an upper alternating current magnet 160a and a lower alternating current magnet 160b. In this embodiment, the upper alternating current magnet 160a is preferably operated at a variable intensity while the lower alternating current magnet 160b operating at a constant intensity. The varying intensity of the upper alternating current magnet 160a allows the separator 110 to be adjusted based upon variations of the iron ore material feed rate.

In this embodiment, the separator 110 preferably includes an upper ultrasonic transducer 170a and a lower transducer 170b to provide adequate agitation of the iron ore material passing through the elutriator 112. The upper ultrasonic transducer is preferably attached to the outside of the elutriator 112 above the upper alternating current magnet 160a. The lower ultrasonic transducer 170b is preferably attached to the elutriator 112 between the upper alternating current magnet 160a and the lower alternating current magnet 160b. Constructing the separator 110 with the upper ultrasonic transducer 170a and the lower ultrasonic transducer 170b enhances the ability to maintain the material within the elutriator in a sufficiently homogeneous mixture to assist in separating magnetite from gangue.

The iron ore material is preferably introduced into the elutriator through an iron ore feed port 122 as preferably located between the upper alternating current magnet 160a and the lower alternating current magnet 160b. The enriched iron ore is collected through an enriched material collection port 140 that is preferably located proximate to where the main body portion 114 and the conical portion 116 intersect. Water is introduced into the elutriator 114 through a water feed port 130 that is located at a lower end of the conical lower portion 116. Waste material is collected in a trough 150 that is mounted at an upper end of the elutriator 112. Waste material is then directed through a waste collection line 152 to water collection process or to a disposal unit.

The water flow rate is selected so that the flow is sufficiently fast to sweep the gangue away from the magnetite but slow enough to allow the strings of magnetite to move downward. A person of ordinary skill in the art will appreciate that the particular flow rate needed to obtain a desired recovery rate depends on a variety of factors, such as the shape of the elutriator and the grade of iron ore fed into the elutriator 112.

The iron ore material and water feed rates are preferably selected to provide an average iron ore material residence time in the elutriator of between 1 and 9 minutes. Water and iron ore material are preferably introduced into the elutriator at a ratio of approximately 8:1. As described above, an advantage of the present invention is that it is possible to use longer residence times to enhance the magnetite recovery without decreasing the concentration of magnetite in the iron ore concentrate.

Characteristics of the iron ore concentrate may be varied by changing the height of the port 142 in which the iron ore concentrate is collected. For example, moving the port 142 downward allows a higher purity iron ore concentrate to be collected while moving the port 142 upward reduces the water concentration in the iron ore concentrate.

A person of ordinary skill in the art will appreciate that the utility of the present invention extends beyond using the separator and process of the present invention for enriching the magnetite concentration in iron ore. The concepts of the present invention are also suitable for separating other types of magnetic materials, such as upgrading difficult-to-separate minerals and in the treatment of certain oils and heavy metal contaminated wastes.

The following Examples are presented to further illustrate the operation of the separator of the present invention. These Examples are not intended to limit the scope of the present invention.

Example 1

Enriched iron ore samples were prepared to illustrate the performance of the ultrasonic magnetic separator of the present invention. The elutriator used for enriching the iron ore samples had a substantially cylindrical body portion with a diameter of approximately 4 inches and a length of approximately 48 inches. A substantially conical lower portion was attached to a lower end of the body portion. The conical portion had a length of approximately 18 inches.

The separator included 2 alternating current magnetic coils. Each magnetic coil weighed approximately 25 pounds and contained approximately 1360 feet of wire. Each magnetic coil had an inner diameter of approximately 5.5 inches and an outer diameter of approximately 7.5 inches. The magnetic coils were operated 120 volts, 4–6 amps, and 100–200 gauss.

The ultrasonic transducer was inserted into the elutriator through the upper end. The ultrasonic transducer was manufactured by Sonics and Materials of Danbury, Conn., under the designation VibraCell 600.

To examine the effects of the iron ore particle size on the purity of the enriched iron ore material, the iron ore was used at three particle sizes. The first iron ore material was finisher feed having particle size of about 80 percent less than 325 mesh. A second iron ore material particle size was about 90 percent less than 400 mesh. The second iron ore particle size was produced by subjecting the finisher feed to a 5 minute grind process. A third iron ore material particle size was greater than about 98 percent less than 500 mesh. The third iron ore particle size was produced by subjecting the finisher feed to a 15 minute grind process. Each of the iron ore material samples had an initial gangue concentration of approximately 11.5 percent.

The iron ore material was introduced into the elutriator through a feed line located proximate to the upper end of the elutriator. The rate was selected to provide an average iron ore material residence time in the elutriator of between 1 and 9 minutes. Water was introduced through a lower end of the elutriator. The water feed rate was selected based on the iron ore material feed rate so that the water-iron ore material ratio was approximately 8:1.

The gangue rejection rates of the iron ore concentrate for each of the residence times are set forth in Table 1. The magnetite recovery at each of the residence times was greater than 90 percent. The data illustrates that the residence time needed to obtain a desired rate of liberated gangue rejection decreases as the particle size of the iron ore material is decreased. The residence time needed to reject approximately 90 percent of the liberated gangue in the iron ore material for the first, second, and third iron ore particle sizes were approximately 5, 3, and 2 minutes, respectively.

TABLE 1

| Residence Time (minutes) | Liberated Gangue Rejection (% Weight) | | |
| --- | --- | --- | --- |
| | 80 percent 325 mesh | 90 percent 400 mesh | 98 percent 500 mesh |
| 1 | 50 | 74 | 79 |
| 2 | 74 | 88 | 94 |
| 3 | 82 | 92 | 95 |
| 4 | 87 | 94 | 96 |
| 5 | 90 | 95 | 97 |
| 6 | 92 | 96 | 98 |
| 7 | 95 | 98 | 98 |
| 8 | 96 | 98 | 99 |
| 9 | 98 | 99 | 99 |

Example 2

The procedure and elutriator described in Example 1 were utilized for this Example with the following exceptions. The iron ore material used for each of the trials had a granulation of approximately 80 percent less than 325 mesh. Three levels of ultrasound were introduced into the elutriator during these trials: no ultrasound, low ultrasound, and high ultrasound. The low ultrasound had an intensity of approximately 75 watts and the high ultrasound had an intensity of approximately 150 watts. The average iron ore material residence time in the elutriator was selected at either 2, 4, 10, 15, or 20 minutes by varying the iron ore material feed rates. The water feed rate was selected based on the iron ore material feed rate so that water and iron ore material were fed at a ratio of about 8:1.

The gangue concentration was measured for each of the iron ore concentrates obtained during these trials. The magnetite recovery for each of the trials was greater than 90 percent. The results of these trials are set forth in Table 2. Similar to the data in Table 1, the gangue concentration decreased for each of the ultrasound intensities as the residence time increased. The gangue concentration also decreased as the level of ultrasound was increased. While using a higher ultrasound intensity allows the residence time needed to obtain a desired gangue concentration to be reduced, the elutriator and process of the present invention produced superior results to prior art processes without the need to use chemical flocculation agents.

TABLE 2

| Residence Time (minutes) | No Ultrasound | Low Ultrasound | High Ultrasound |
| --- | --- | --- | --- |
| 2 | 6.3 | 6.2 | 5.7 |
| 4 | 5.6 | 5.5 | 4.8 |
| 10 | 5.5 | 5.1 | 4.1 |
| 15 | 5.4 | 4.9 | n/a |
| 20 | 5.1 | 4.5 | 3.7 |

Although the present invention has been described with reference to preferred embodiments, workers skilled in the art will recognize that changes may be made in form and detail without departing from the spirit and scope of the invention.

What is claimed is:

1. A magnetic ore enrichment system for enriching magnetic ore concentration in a feed material, the system comprising:

an elutriator having a feed material port for introducing a feed material into the elutriator and an enriched material port for collecting an enriched material from the elutriator, wherein the magnetic ore concentration of the enriched material is greater than the magnetic ore concentration of the feed material;

an alternating current magnet for generating a uniform low strength magnetic field within the elutriator; and an ultrasonic transducer for introducing ultrasonic energy into the elutriator.

2. The magnetic ore purification system of claim 1, and further comprising a water feed port for introducing water into the elutriator.

3. The magnetic ore purification system of claim 1, wherein the feed material port is opposite the water feed port so that the feed material and water flow through the elutriator in substantially countercurrent directions.

4. A magnetic ore purification system for enriching a concentration of magnetic ore in a feed material, the system comprising:

an elutriator having a feed material port for introducing a feed material into the elutriator and an enriched material port for collecting an enriched material from the elutriator, wherein the enriched material has a magnetic ore concentration that is greater than the concentration of magnetic ore and feed material; and an alternating current magnetic coil for producing a uniform low strength magnetic field in the elutriator, wherein the system is capable of producing enriched material with a magnetic ore concentration of greater than approximately 95 percent by weight.

5. The magnetic ore purification system of claim 4, and further comprising an ultrasonic transducer for introducing ultrasonic energy into the elutriator.

6. A magnetic ore enrichment process comprising:

introducing a feed material into an elutriator, wherein the feed material contains a first magnetic ore concentration;

introducing water into the elutriator so that the water mixes with the feed material and forms a slurry;

applying a first uniform low strength magnetic field to the slurry;

subjecting the slurry to ultrasonic energy; and collecting an enriched material having a second magnetic ore concentration that is greater than the first magnetic ore concentration.

7. The magnetic ore enrichment process of claim 6, wherein the second magnetic ore concentration is greater than about 98 percent by weight.

8. The magnetic ore enrichment process of claim 6, wherein the second magnetic ore concentration includes approximately 90 percent by weight of magnetic ore from the first magnetic ore concentration.

9. The magnetic ore enrichment process of claim 6 and further comprising flowing the feed material and the water through the elutriator in substantially countercurrent directions.

10. The magnetic ore enrichment process of claim 6, and further comprising applying a second uniform low strength magnetic field to the slurry.

11. The magnetic ore enrichment process of claim 10, wherein the first magnetic field is applied with a constant amperage.

12. The magnetic ore enrichment process of claim 11, wherein the second magnetic filed is applied with an amperage that is directly related to the rate at which the feed material is fed into the elutriator.

13. The magnetic ore enrichment process of claim 6, and further comprising grinding the feed material to approximately 79 percent by weight less than 325 mesh.

14. The magnetic ore enrichment process of claim 6, and further comprising grinding the feed material to approximately 98 percent by weight less than 500 mesh.

15. The magnetic ore enrichment process of claim 6, wherein the feed material has an average residence time in the elutriator of between about 1 and 9 minutes.

16. A magnetic ore enrichment process comprising:

introducing a feed material into an elutriator, wherein the feed material contains a first concentration of magnetic ore;

introducing water into the elutriator so that the water mixes with the feed material and forms a slurry;

applying a first uniform low strength magnetic field to the slurry with an alternating current magnet; and collecting an enriched portion from the elutriator, wherein the enriched portion has a magnetic ore concentration of greater than about 95 percent by weight.

17. The magnetic ore enrichment process of claim 16, wherein the magnetic ore concentration of the enriched portion has greater than approximately 90 percent by weight of magnetic ore of the feed material.

18. The magnetic ore enrichment process of claim 16, and further comprising subjecting the slurry to ultrasonic energy.

19. The magnetic ore enrichment process of claim 16, wherein the feed material and water flow through the elutriator in substantially countercurrent directions.

20. The magnetic ore enrichment process of claim 16, and further comprising applying a second uniform low strength magnetic field to the slurry with a magnet.

21. The magnetic ore enrichment process of claim 20, wherein the second uniform low strength magnet field is applied by an alternating current magnet.

22. The magnetic ore enrichment process of claim 21, wherein the first magnetic field is applied at a constant amperage.

23. The magnetic ore enrichment process of claim 21, wherein the second magnetic field is applied with an amperage that is directly related to the rate at which the feed material is fed into the elutriator.

* * * * *